(12) United States Patent
Hüger et al.

(10) Patent No.: US 11,807,225 B2
(45) Date of Patent: Nov. 7, 2023

(54) METHOD AND DEVICE FOR PROVIDING ASSISTANCE TO A MOTOR VEHICLE DURING A PROCESS OF EXITING A LATERAL PARKING SPACE

(71) Applicant: Volkswagen Aktiengesellschaft, Wolfsburg (DE)

(72) Inventors: Philipp Hüger, Rühen (DE); Bastian Göricke, Wolfsburg (DE); Christian Jördens, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 203 days.

(21) Appl. No.: 17/620,514

(22) PCT Filed: Jun. 2, 2020

(86) PCT No.: PCT/EP2020/065170
§ 371 (c)(1),
(2) Date: Dec. 17, 2021

(87) PCT Pub. No.: WO2020/254098
PCT Pub. Date: Dec. 24, 2020

(65) Prior Publication Data
US 2022/0348190 A1    Nov. 3, 2022

(30) Foreign Application Priority Data

Jun. 21, 2019   (DE) .......................... 102019209049.4

(51) Int. Cl.
*G08G 1/14* (2006.01)
*B60W 30/06* (2006.01)
(Continued)

(52) U.S. Cl.
CPC ........ *B60W 30/06* (2013.01); *B60W 60/0015* (2020.02); *G01S 15/08* (2013.01);
(Continued)

(58) Field of Classification Search
CPC ............ B60W 30/06; B60W 60/0015; B60W 2420/42; B60W 2420/52; B60W 2554/80;
(Continued)

(56) References Cited

U.S. PATENT DOCUMENTS

| 2005/0060073 A1* | 3/2005 | Tanaka | ............... B62D 15/0285 |
|---|---|---|---|
| | | | 340/932.2 |
| 2010/0238051 A1* | 9/2010 | Suzuki | .................. G06T 15/205 |
| | | | 340/932.2 |

(Continued)

FOREIGN PATENT DOCUMENTS

| CN | 108528441 A | 9/2018 |
|---|---|---|
| DE | 102009028760 A1 | 2/2011 |

(Continued)

OTHER PUBLICATIONS

PCT/EP2020/065170. International Search Report (dated Sep. 18, 2020).
DE102019209049.4 Office Action (dated Mar. 11, 2020).

*Primary Examiner* — Tai T Nguyen
(74) *Attorney, Agent, or Firm* — Peter Zura; LOZA & LOZA, LLP (57) ABSTRACT

Technologies and techniques for providing assistance to a motor vehicle during a process of exiting a lateral parking space. A device is configured with at least one surroundings sensor system and at least one control unit with an assigned memory to acquire successive values of distances from adjacent motor vehicles during a parking process and to store them in a map of the surroundings. The device may be designed in such a way that, before the start of the process of exiting a parking space, current values of distances from the adjacent motor vehicles are acquired and compared with the distance values stored in the map of the surroundings, (Continued)

wherein, when they correspond, a parking-space-exiting trajectory is made available by means of the map of the surroundings.

18 Claims, 8 Drawing Sheets

(51) Int. Cl.
| | | |
|---|---|---|
| *G01S 15/86* | (2020.01) | |
| *B60W 60/00* | (2020.01) | |
| *G06V 20/58* | (2022.01) | |
| *G01S 15/08* | (2006.01) | |
| *G01S 15/89* | (2006.01) | |
| *G01S 15/931* | (2020.01) | |

(52) U.S. Cl.
CPC .............. *G01S 15/86* (2020.01); *G01S 15/89* (2013.01); *G01S 15/931* (2013.01); *G06V 20/586* (2022.01); *B60W 2420/42* (2013.01); *B60W 2420/52* (2013.01); *B60W 2554/80* (2020.02); *B60W 2556/40* (2020.02); *G01S 2015/934* (2013.01); *G01S 2015/935* (2013.01); *G01S 2015/936* (2013.01)

(58) Field of Classification Search
CPC .... B60W 2556/40; G01S 15/08; G01S 15/86; G01S 15/89; G01S 15/931; G06V 20/586
USPC ...................................................... 340/932.2
See application file for complete search history.

(56) References Cited

U.S. PATENT DOCUMENTS

| | | | | |
|---|---|---|---|---|
| 2016/0075374 | A1* | 3/2016 | Yamashita | B62D 15/0285 |
| | | | | 701/41 |
| 2016/0117866 | A1* | 4/2016 | Stancato | H04L 12/1895 |
| | | | | 705/13 |
| 2017/0355307 | A1* | 12/2017 | Ha | G08G 1/143 |

FOREIGN PATENT DOCUMENTS

| | | | |
|---|---|---|---|
| DE | 102009029388 | A1 | 3/2011 |
| DE | 102012008858 | A1 | 11/2012 |
| DE | 102011080148 | A1 | 1/2013 |
| DE | 102013015349 | A1 | 4/2014 |
| DE | 102013114563 | A1 | 6/2015 |
| DE | 102014200611 | A1 | 7/2015 |
| DE | 102014220263 | A1 | 4/2016 |
| DE | 102016121474 | A1 | 5/2018 |
| DE | 102018212975 | A1 | 2/2019 |
| JP | 2011016395 | A | 1/2011 |

* cited by examiner

FIG. 8

METHOD AND DEVICE FOR PROVIDING ASSISTANCE TO A MOTOR VEHICLE DURING A PROCESS OF EXITING A LATERAL PARKING SPACE

RELATED APPLICATIONS

The present application claims priority to International Patent App. No. PCT/EP2020/065170 to Huger et al., filed Jun. 2, 2020, which further claims priority to German Pat. App. No. 10 2019 209 049.4 filed Jun. 21, 2019, the contents of each being incorporated by reference in their entirety herein.

TECHNICAL FIELD

The present disclosure relates to a method and to a device for providing assistance to a motor vehicle during a process of exiting a perpendicular parking space.

BACKGROUND

Perpendicular parking spaces are parking spaces in which the parked motor vehicle is positioned with the vehicle longitudinal axis thereof perpendicular to the roadway. Exiting perpendicular parking spaces can represent a challenging driving task, and exiting with an optimal trajectory is in particular necessary in situations where the driving corridor width is narrow. Presently, parking concepts exist that comprise an unparking assistance system, which upon activation help the vehicle inch its way out of the parking space since the system only takes distances that can be measured directly by way of sensors into consideration. As a result, the assistance system does not select the optimal trajectory and multiple maneuvers may be required to merge with traffic, so that the motor vehicle can travel along the roadway.

A method for operating a vehicle, and in particular for approaching a parking space in a parking zone with an obstructed view, is known from DE 10 2013 015 349 A1, in which environment data of the vehicle is detected, wherein an identification is carried out, when approaching a parking space in the parking zone, as to whether this is a home parking space or whether the parking zone is a home parking zone. When a home parking space or a home parking zone is identified, and the vehicle approaches the identified home parking space or the identified home parking zone, detected environment data or driving data is stored or updated. An exiting trajectory is also described.

A method for providing assistance during a parking process of a motor vehicle is known from DE 10 2014 220 263 A1, the method comprising the following steps:

moving the motor vehicle for the first time from a starting position into a parking position;
when the motor vehicle is moved for the first time from the starting position into the parking position, continuously detecting data about at least three driving parameters of the motor vehicle, which are available for recording a vehicle trajectory;
storing the detected data about the at least three driving parameters of the motor vehicle; and
automatically moving the motor vehicle between the starting position and the parking position as a function of the stored detected data about the at least three driving parameters in response to the vehicle receiving an activation signal.

The three driving parameters are a current vehicle acceleration, a current steering angle, and a currently engaged gear. It is described that the vehicle is pulled into and then pulled out of a parking space so that the vehicle occupants are able to get out of the vehicle, whereupon the vehicle is then pulled into in the final position. It is also mentioned that the vehicle is pulled out of the space, so that the vehicle occupants can later enter the vehicle again unimpeded.

A method of the type in question for providing assistance to a motor vehicle during a process of exiting a perpendicular parking space is known from DE 10 2009 028 760 A1.

A method for providing assistance to a driver of a motor vehicle during a maneuver for backing out of a perpendicular parking space is known from DE 10 2011 080 148 A1, wherein lateral boundary lines are determined. In one embodiment, it is described that, for the purpose of determining the lateral boundary lines, lateral boundaries of objects adjacent to the motor vehicle are utilized which were detected when the motor vehicle was pulled into the perpendicular parking space and stored in a non-volatile memory.

A method for carrying out an autonomous parking operation of a motor vehicle is known from DE 10 2012 008 858 A1, wherein a communication link exists between an operator situated outside the motor vehicle and the motor vehicle, by way of which at least one command for activating the autonomous parking operation of the motor vehicle can be transmitted. Before the autonomous parking operation of the motor vehicle begins, the target position and/or the last driven trajectory of the motor vehicle are stored, wherein this data is utilized for carrying out the autonomous parking operation.

A parking aid for providing assistance to a vehicle when pulling into a parking space is known from DE 10 2018 212 975 A1.

The technical issue underlying the present disclosure is that of improving a method for providing assistance to a motor vehicle during a process of exiting a perpendicular parking space and of configuring a suitable device for the same.

BRIEF SUMMARY

The technical issues described above are addressed by the features recited in the independent claims below. Further advantageous embodiments of the present disclosure will be apparent from the dependent claims.

In some examples, a method is disclosed for providing assistance to a motor vehicle during a process of exiting a perpendicular parking space, comprising initially parking the motor vehicle in the perpendicular parking space, wherein distance values with respect to adjacent vehicles are detected during the parking process by means of at least one environment sensor system. These distance values detected during the parking process are stored in an environment map, or the environment map is compiled by way of the distance values. Prior to starting an exiting process, the current distance values with respect to the adjacent motor vehicles are detected, wherein it is preferred that an extended period of time is between the processes of pulling into and out of the parking space and the motor vehicle was shut off. The currently detected distance values are compared to the most recently stored distance values during the parking process. If the current distance values and the most recently stored distance values are identical, an exiting trajectory which allows optimal exiting is provided by means of the environment map. If, in contrast, the distance values are not the same, the stored environment map is no longer valid, and the motor vehicle has to inch its way out of the perpendicular parking space in the conventional manner. The basic idea of the present disclosure is that, during the parking process, the environment sensor system is able to detect all the relevant distance values of the adjacent motor vehicles, which are no longer directly detectable in the parked state. Based on the comparison of the distance values, it is then possible to check the validity of the environment map, and this old data may be resorted to if the check is positive, which simplifies the exiting process in many cases.

Moreover, in addition to the distances, at least one further feature of the adjacent motor vehicles is detected and stored, wherein the at least one further feature is additionally compared to a currently detected feature prior to starting the exiting process, wherein the exiting trajectory is only provided when the distances are the same, and the at least one further feature is the same.

The at least one further feature may be the color, contour and/or motor vehicle brand. The at least one further feature may be detected by way of at least one camera.

In one embodiment, the provided exiting trajectory is followed in a fully automated manner. However, it is also possible to only display the trajectory to the motor vehicle driver or to only offer steering recommendations or steering assistance.

In a further embodiment, the parking process is also carried out in a fully automated manner.

In a further embodiment, the contour pointing toward the road of at least one motor vehicle is detected, so that the exiting trajectory can be further optimized.

In a further embodiment, the distance values are detected by way of ultrasonic sensors.

With respect to the design of the device, the content of the preceding embodiments is incorporated by reference in its entirety.

BRIEF DESCRIPTION OF THE DRAWINGS

The present disclosure will be described in more detail hereafter based on a preferred exemplary embodiment. In the drawings.

DETAILED DESCRIPTION

Figure 1:
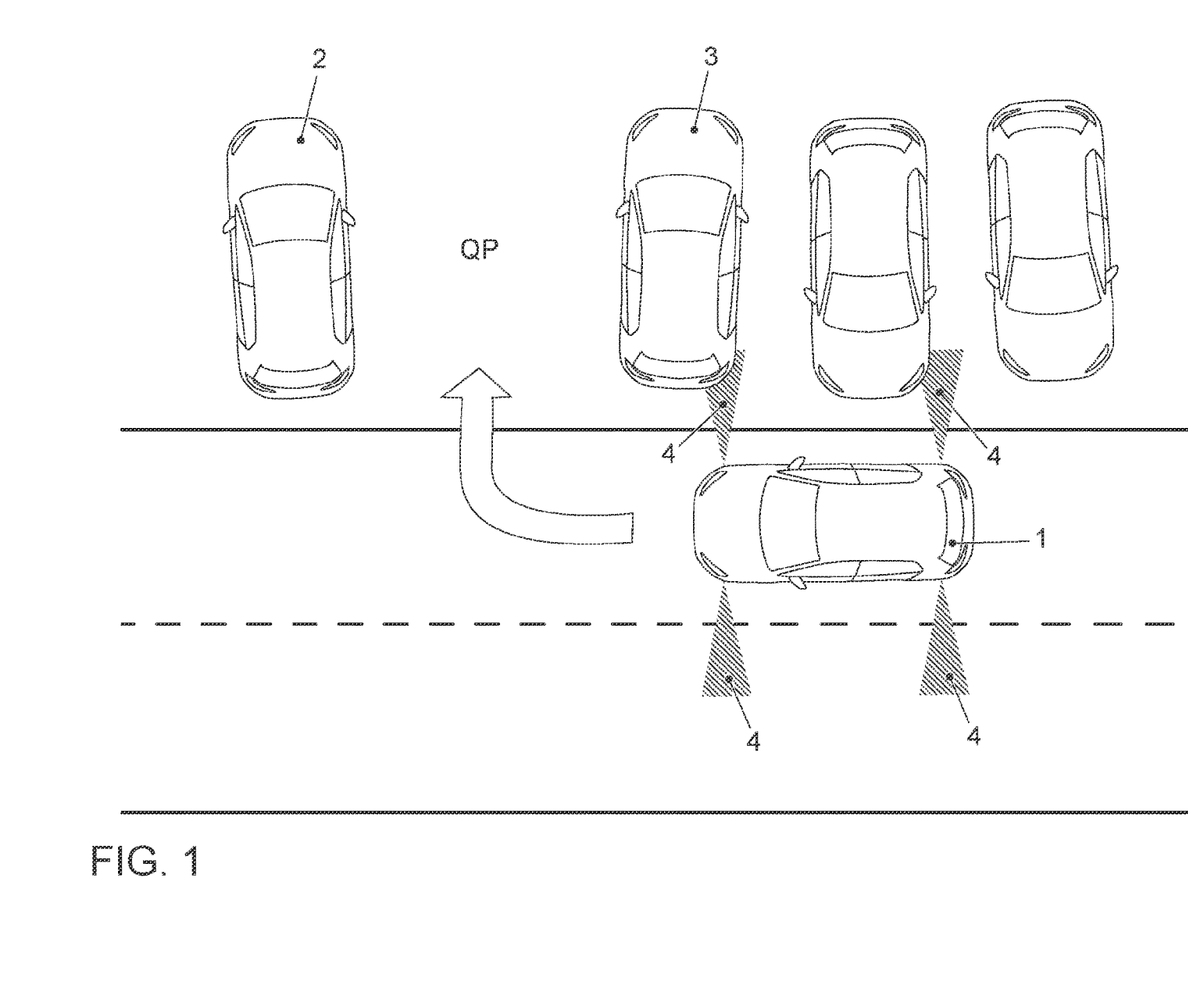
FIG. 1 shows a schematic traffic situation prior to pulling into a perpendicular parking space, under some aspects of the present disclosure.

FIG. 1 schematically shows an example of a traffic situation in which a motor vehicle 1 intends to pull into a perpendicular parking space QP. The perpendicular parking space QP is delimited by two adjacent motor vehicles 2, 3. Furthermore, the sensing areas 4 of four laterally installed ultrasonic sensors are shown. As can be seen, the detectable area of the ultrasonic sensors is limited at a point in time.

Figure 2:
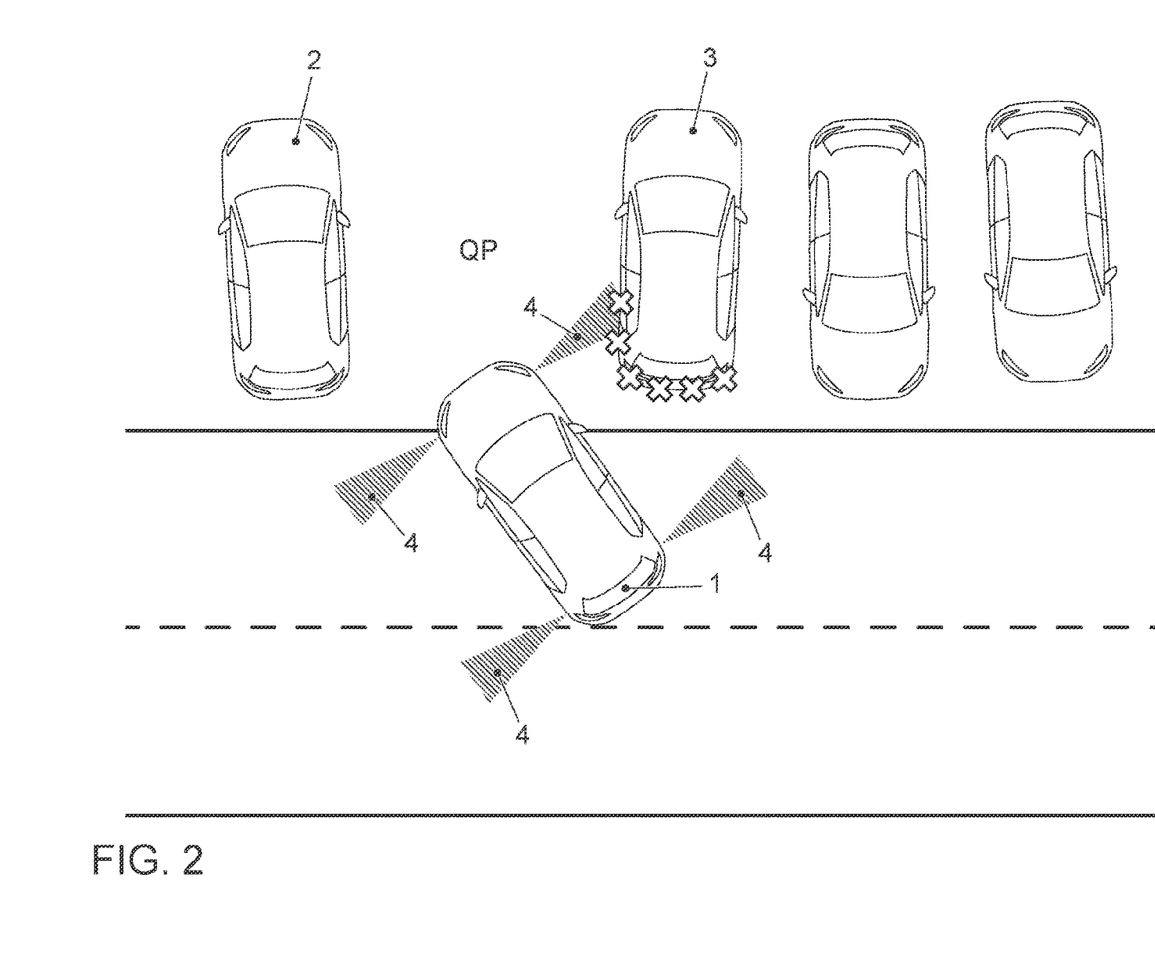
FIG. 2 shows a schematic traffic situation while pulling into a perpendicular parking space, under some aspects of the present disclosure.

When the motor vehicle 1 pulls into the perpendicular parking space QP, the ultrasonic sensor system of the motor vehicle 1 continuously detects distance values of the motor vehicle 3, thereby detecting the contour thereof in the region facing the road. This is symbolized by the crosses in FIG. 2.

Figure 3:
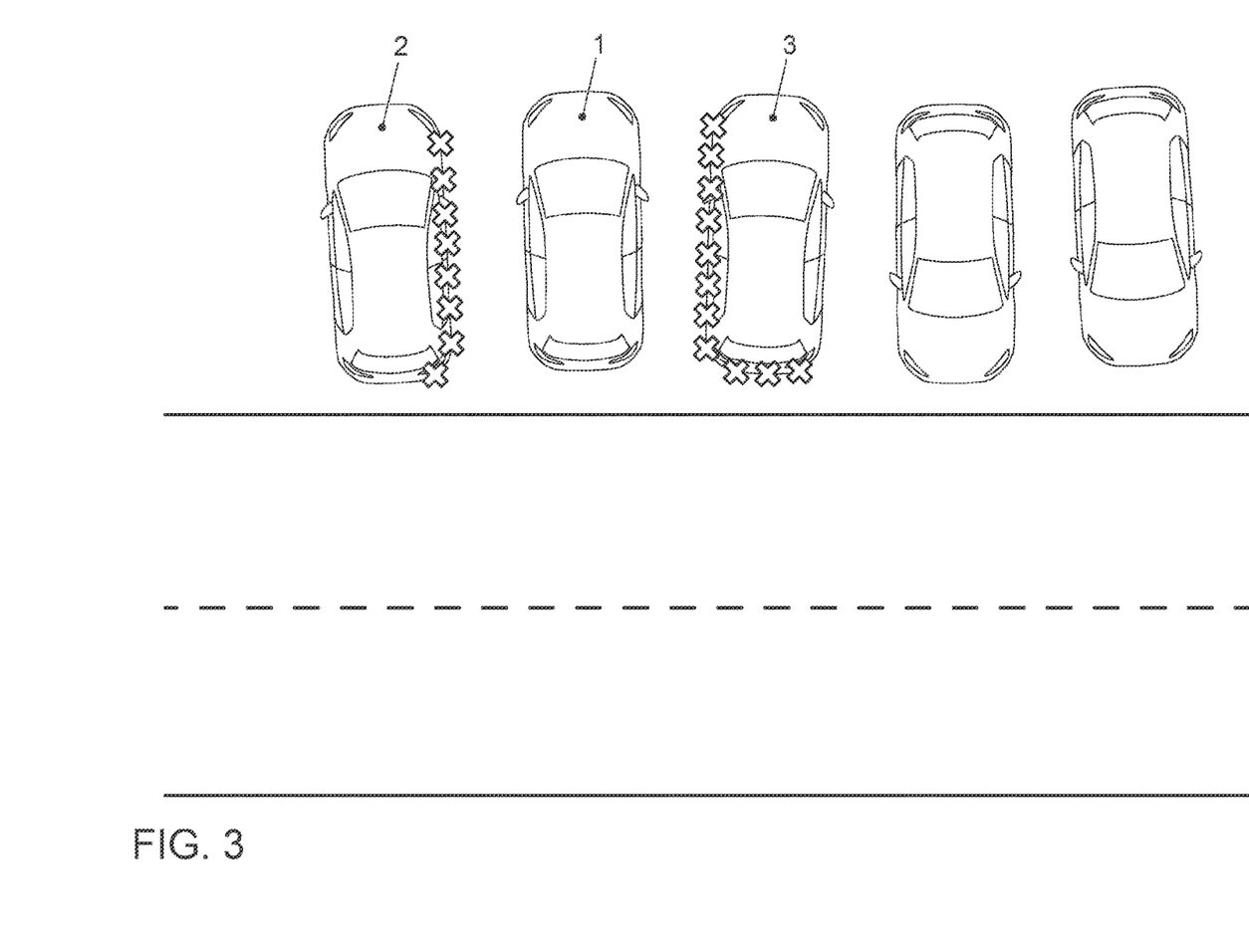
FIG. 3 shows a schematic traffic situation after the parking process has ended, under some aspects of the present disclosure.

When the parking process has been completed, the motor vehicle 1 has also measured the lateral distance values of the adjacent motor vehicles 2, 3, which is again symbolized by the crosses in FIG. 3. All these distance values are plotted in an environment map, or the map is compiled with the aid of the distance values. In addition, further features of the motor vehicles 2, 3 can be detected and stored.

Figure 4:
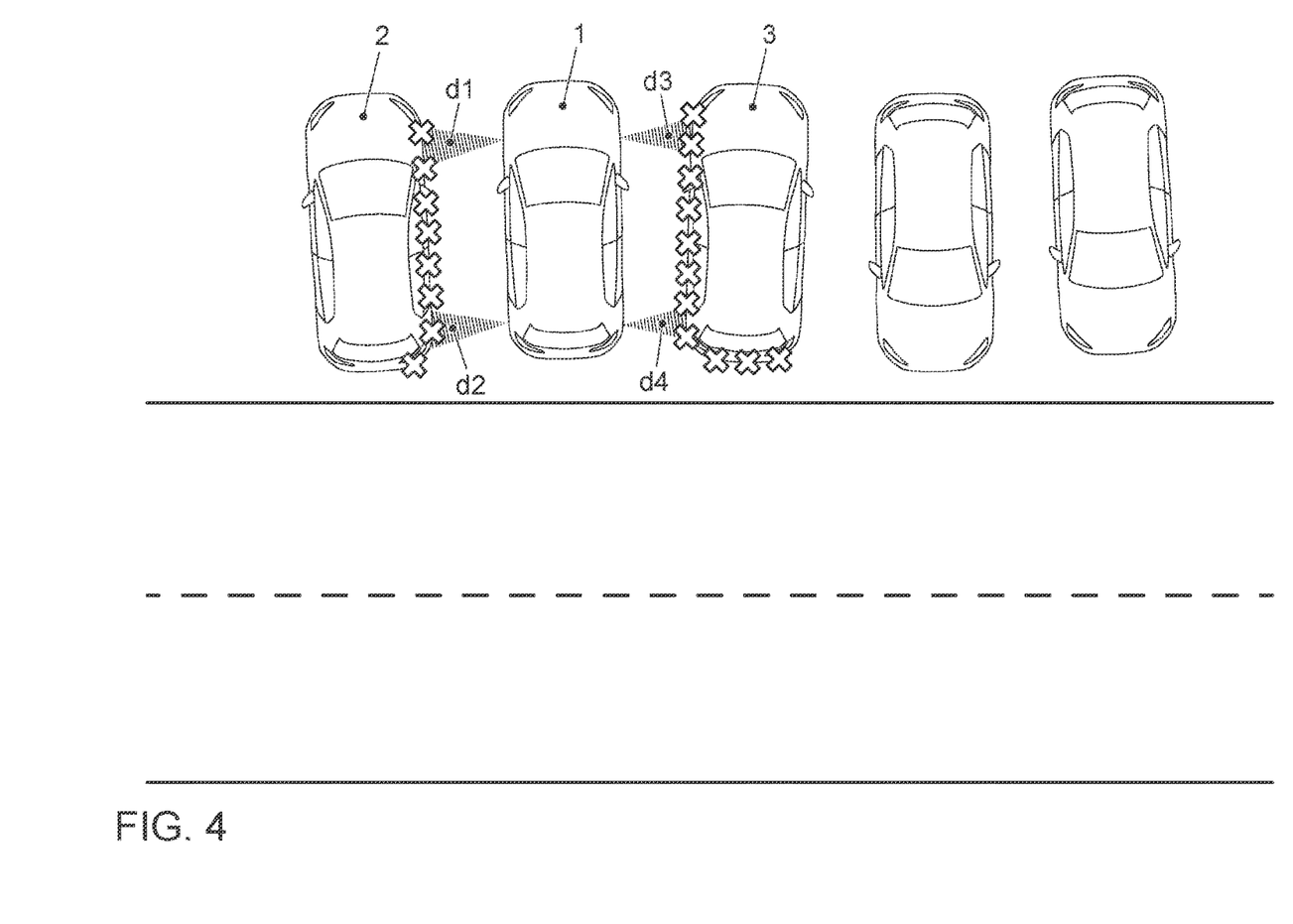
FIG. 4 shows a schematic traffic situation after the parking process has ended, prior to shutting off the motor vehicle under some aspects of the present disclosure.

In FIG. 4, the motor vehicle 1 has been completely pulled into the space and, prior to the motor vehicle 1 being shut off, detects the distance values d1 to d4, which can only be measured directly. Thereafter the motor vehicle 1 is shut off, and the sensor system is switched off.

Figure 5:
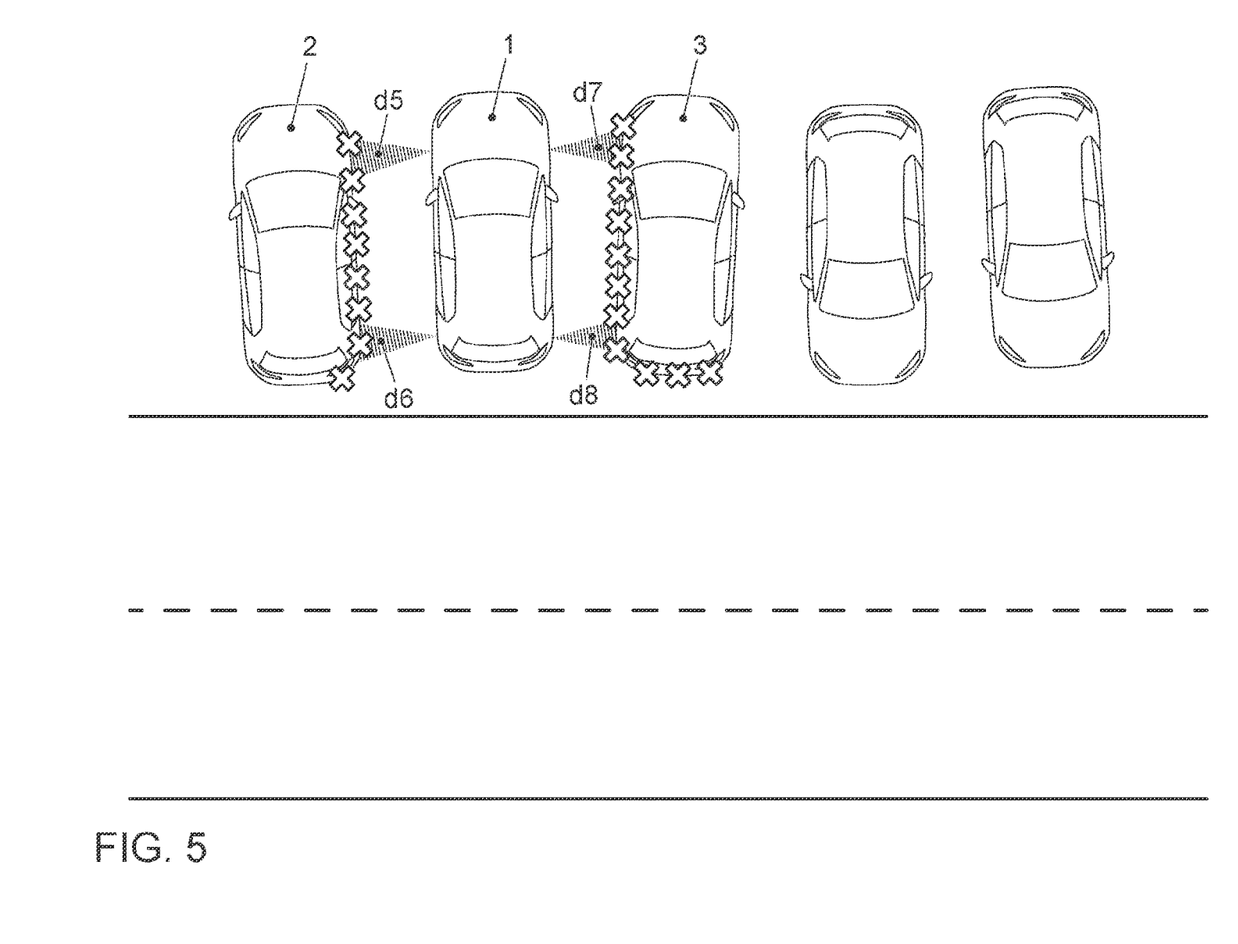
FIG. 5 shows a schematic traffic situation after the motor vehicle has been turned on, prior to starting the exiting process under some aspects of the present disclosure.
Figure 6:
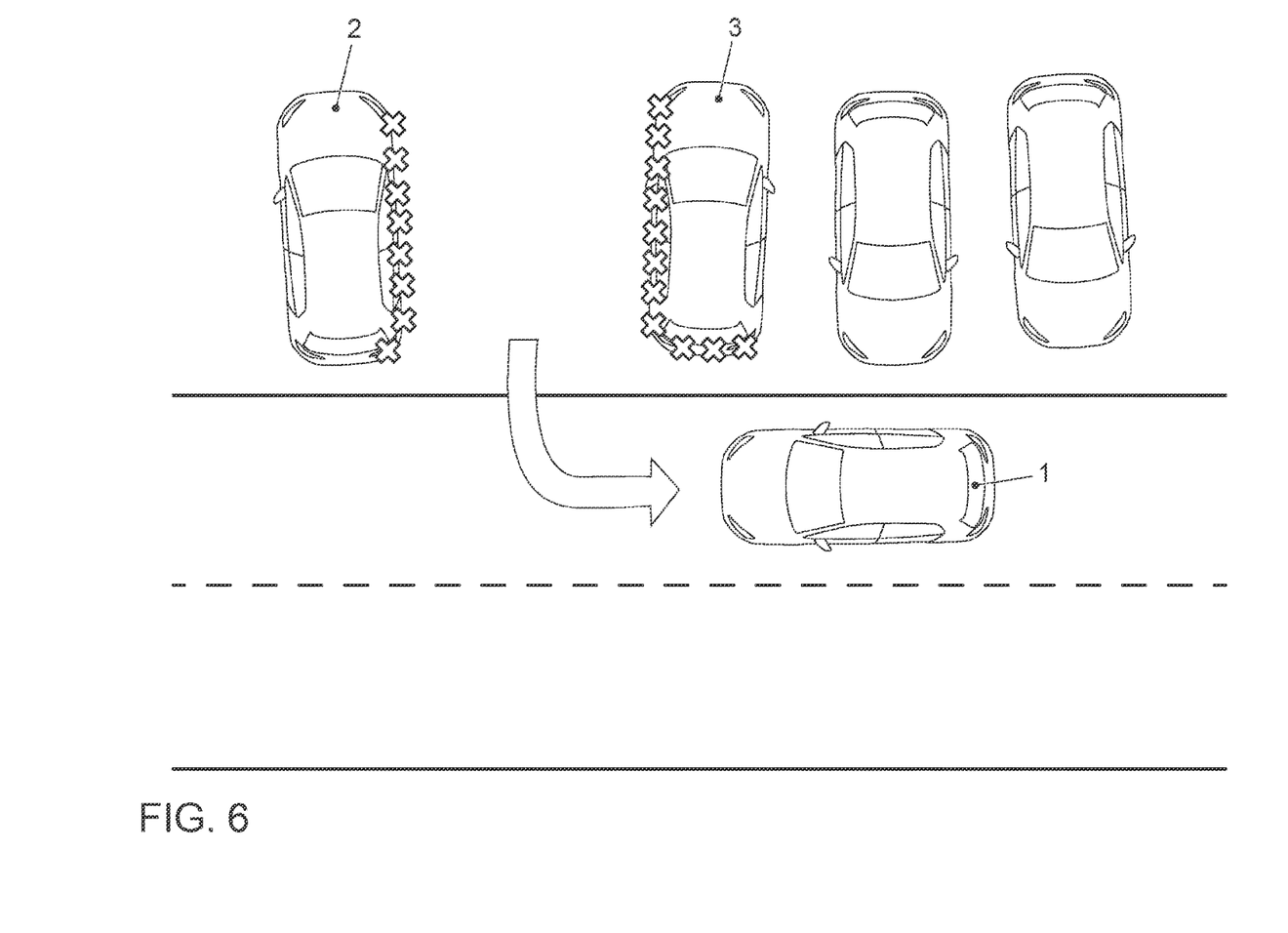
FIG. 6 shows a schematic traffic situation while exiting the perpendicular parking space under some aspects of the present disclosure.

FIG. 5 shows an example where the motor vehicle 1 is turned back on and is to be pulled out of the perpendicular parking space QP. Initially, the current distance values d5 to d8 are measured and compared to the distance values d1 to d4 stored prior to the vehicle being shut off. If further features were stored, these are also currently detected and compared. If the distance values are identical, that is, d1=d5, d2=d6, d3=d7, and d4=d8, it is assumed that nothing has changed, and the environment map is still valid. As a result, the motor vehicle 1 knows the exact extension of the relevant portions of the motor vehicles 2, 3 and can provide an optimal trajectory, which is schematically indicated in FIG. 6.

Figure 7:
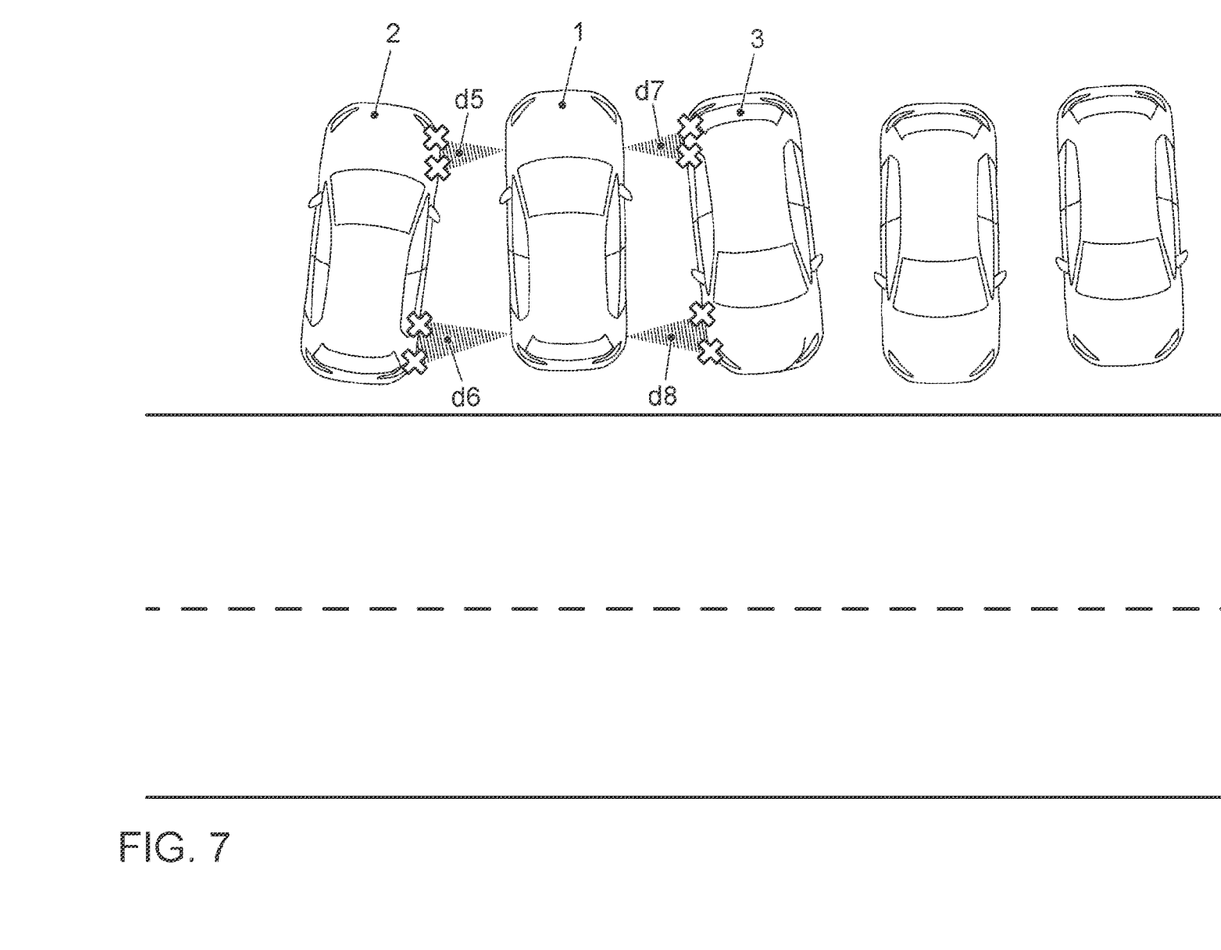
FIG. 7 shows a schematic alternative traffic situation after the motor vehicle has been turned on, prior to starting the exiting process under some aspects of the present disclosure.

FIG. 7 shows that the two motor vehicles 2, 3 are no longer the same as when the vehicle was parked according to FIG. 4. Accordingly, the currently measured distance values d5 to d8 are different from the stored distance values d1 to d4, and the environment map is no longer valid.

A special case is that an adjacent motor vehicle 2, 3 is absent. In this case, an optimal trajectory can nonetheless be offered, even though the distances are not the same. However, this is not mandatory, since cases are conceivable in which objects are parked in the adjacent parking space, which are in the way of the trajectory, but not detectable by the sensor system.

Figure 8:
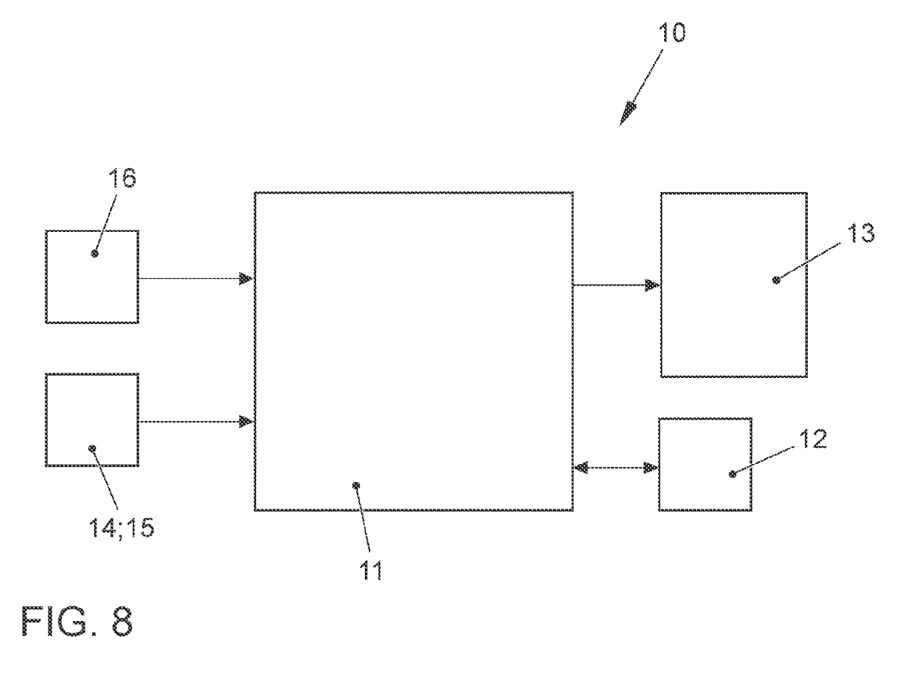
FIG. 8 shows a schematic block diagram of a device for providing assistance to a motor vehicle when exiting a perpendicular parking space under some aspects of the present disclosure.

FIG. 8 shows a schematic block diagram of a device 10 for providing assistance to a motor vehicle during a process of exiting a perpendicular parking space. The device 10 comprises a control unit 11, a memory 12, and an environment map 13. The device 10 furthermore comprises an environment sensor system 14, which comprises multiple ultrasonic sensors 15. Finally, the device 10 comprises at least one camera 16.

During a parking process, the device 10 continuously receives data from the ultrasonic sensors 15, and stores this data in the memory 12. Based on its own position determination, steering movement and the stored distance values, the control unit 11 compiles an environment map 13 and stores it. Furthermore, the at least one camera 16 ascertains at least one further feature of the adjacent motor vehicles 2, 3 and stores these features in the environment map 13.

Before starting the exiting process, the device 10 again receives distance values d5 to d8 from the ultrasonic sensors 15, as well as the current detected features of the adjacent motor vehicles 2, 3. The control unit 11 then compares these current values to the stored values and provides an exiting trajectory if the values are identical, wherein the exiting trajectory is calculated by means of the environment map 13.

LIST OF REFERENCE NUMERALS 1) motor vehicle
2, 3) neighboring motor vehicles
4) sensing areas
10) device
11) control unit
12) memory
13) environment map
14) environment sensor system
15) ultrasonic sensors
16) camera
d1-d4) distance values
d5-d6) distance values
QP) perpendicular parking space

The invention claimed is:

1. A method for providing assistance to a motor vehicle during an exiting process of a perpendicular parking space, comprising:
    detecting distance values of adjacent motor vehicles during a parking process in the perpendicular parking space via at least one environment sensor system;
    detecting at least one further feature of adjacent motor vehicles in an area of the perpendicular parking space, wherein the further feature comprises one or more of a color, a contour, and a motor vehicle type;
    storing the distance values detected during the parking process in an environment map;
    storing the detected at least one further feature;
    detecting current distance values associated with the adjacent motor vehicles prior to starting the exiting process;
    detecting current at least one further feature of adjacent motor vehicles in the area of the perpendicular parking space;
    comparing the detected current distance values with the stored distance values;
    comparing the detected current at least one further feature with the stored at least one further feature; and
    providing an exiting trajectory via the environment map, when the comparing of the detected current distance values with the stored distance values and the comparing of the detected current at least one further feature with the stored at least one further feature are both the same.

2. The method according to claim 1, wherein providing the exiting trajectory comprises providing the exiting trajectory in a fully automated manner.

3. The method according to claim 1, further comprising detecting a contour pointing toward the road of at least one motor vehicle.

4. The method according to claim 1, wherein detecting distance values of adjacent motor vehicles comprises detecting distance values via one or more ultrasonic sensors.

5. The method of claim 4, wherein detecting the current at least one further feature of adjacent motor vehicles in the area of the perpendicular parking space comprises detecting the at least one further feature via a camera.

6. The method according to claim 1, wherein the detecting of current distance values and the detecting of current at least one further feature occurs after the motor vehicle is restarted.

7. A system for providing assistance to a motor vehicle during an exiting process of a perpendicular parking space, comprising:
    at least one environment sensor system;
    at least one control unit, operatively coupled to the at least one sensor system; and
    a memory, operatively coupled to the control unit, wherein the at least one environment sensor system, control unit and memory are configured to:
        detect distance values of adjacent motor vehicles during a parking process in the perpendicular parking space via at least one environment sensor system;
        detect at least one further feature of adjacent motor vehicles in an area of the perpendicular parking space, wherein the further feature comprises one or more of a color, a contour, and a motor vehicle type;
        store the distance values detected during the parking process in an environment map;
        store the detected at least one further feature of adjacent motor vehicles in an area of the perpendicular parking space;
        detect current distance values associated with the adjacent motor vehicles prior to starting the exiting process;
        detect current at least one further feature of adjacent motor vehicles in the area of the perpendicular parking space;
        compare the detected current distance values with the stored distance values;
        compare the detected current at least one further feature with the stored at least one further feature; and
        provide an exiting trajectory via the environment map, when the comparing of the detected current distance values with the stored distance values and the comparing of the detected current at least one further feature with the stored at least one further feature are both the same.

8. The system according to claim 7, wherein the at least one environment sensor system, control unit and memory are configured to provide the exiting trajectory by providing the exiting trajectory in a fully automated manner.

9. The system according to claim 7, wherein the at least one environment sensor system, control unit and memory are configured to detect a contour pointing toward the road of at least one motor vehicle.

10. The system according to claim 7, wherein the at least one environment sensor system, control unit and memory are configured to detect distance values of adjacent motor vehicles by detecting distance values via one or more ultrasonic sensors.

11. The system of claim 10, wherein the at least one environment sensor system, control unit and memory are configured to detect the current at least one further feature of adjacent motor vehicles in the area of the perpendicular parking space by detecting the at least one further feature via a camera.

12. The system according to claim 7, wherein the at least one environment sensor system, control unit and memory are configured to detect current distance values and at least one further feature after the motor vehicle is restarted.

13. A method for providing assistance to a motor vehicle during an exiting process of a perpendicular parking space, comprising:

storing detected distance values of adjacent motor vehicles associated with a previous parking process in the perpendicular parking space via at least one environment sensor system;

storing at least one further feature of adjacent motor vehicles in an area of the perpendicular parking space associated with a previous parking process, wherein the further feature comprises one or more of a color, a contour, and a motor vehicle type;

detecting current distance values associated with the adjacent motor vehicles prior to starting the exiting process;

detecting current at least one further feature of adjacent motor vehicles in the area of the perpendicular parking space;

comparing the detected current distance values with the stored distance values;

comparing the detected current at least one further feature with the stored at least one further feature; and providing an exiting trajectory via the environment map, when the comparing of the detected current distance values with the stored distance values and the comparing of the detected current at least one further feature with the stored at least one further feature are both the same.

14. The method according to claim 13, wherein providing the exiting trajectory comprises providing the exiting trajectory in a fully automated manner.

15. The method according to claim 13, further comprising detecting a contour pointing toward the road of at least one motor vehicle.

16. The method according to claim 13, wherein detecting distance values of adjacent motor vehicles comprises detecting distance values via one or more ultrasonic sensors.

17. The method of claim 16, wherein detecting the current at least one further feature of adjacent motor vehicles in the area of the perpendicular parking space comprises detecting the at least one further feature via a camera.

18. The method according to claim 13, wherein the detecting of current distance values and the detecting of current at least one further feature occurs after the motor vehicle is restarted.

* * * * *